(12) United States Patent
Takahashi

(10) Patent No.: US 6,550,043 B1
(45) Date of Patent: Apr. 15, 2003

(54) SEMICONDUCTOR DEVICE WITH CLOCK SIGNAL SELECTION CIRCUIT

(75) Inventor: Hiroki Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,709

(22) Filed: Feb. 23, 2000

(30) Foreign Application Priority Data

Sep. 13, 1999 (JP) ............................................ 11-259442

(51) Int. Cl.[7] .............................................. G06F 17/50
(52) U.S. Cl. ........................................... 716/6; 713/400
(58) Field of Search ................................ 716/1, 4, 6, 8; 710/25; 327/278; 713/400

(56) References Cited

U.S. PATENT DOCUMENTS

| | | | | |
|---|---|---|---|---|
| 5,125,088 A | * | 6/1992 | Culley | 713/400 |
| 5,497,263 A | * | 3/1996 | Masuda et al. | 327/278 |
| 5,581,746 A | * | 12/1996 | Watanabe | 713/400 |
| 5,809,336 A | * | 9/1998 | Moore et al. | 710/25 |

FOREIGN PATENT DOCUMENTS

JP        2-47743        2/1990

* cited by examiner

*Primary Examiner*—Matthew Smith
*Assistant Examiner*—Thuan Do
(74) *Attorney, Agent, or Firm*—Burns, Doane, Swecker & Mathis, LLP

(57) ABSTRACT

In accordance with a recent high-speed trend of the CPU, it has been demanded a semiconductor device which is capable of varying the frequency of a clock signal to be input to the CPU in accordance with the access speed of the individual peripheral devices, but without using a wait controller so as to readily cope with the case where a low-speed access peripheral device is to be accessed, and in order to meet with this demand, the semiconductor device of the present invention comprises a CPU, an address decoder that decodes an address signal transmitted from the CPU and outputs an address signal specifying signal for specifying an address area in which a designated address is included, a frequency divider that divides a base clock signal and outputs one or more than one low-speed clock signals whose frequencies have been lowered, and a clock signal decision circuit that selects as to which one of the base clock signal and the frequency-divided clock signals is to be input to the CPU in accordance with the address area specifying signal output from said address decoder.

7 Claims, 7 Drawing Sheets

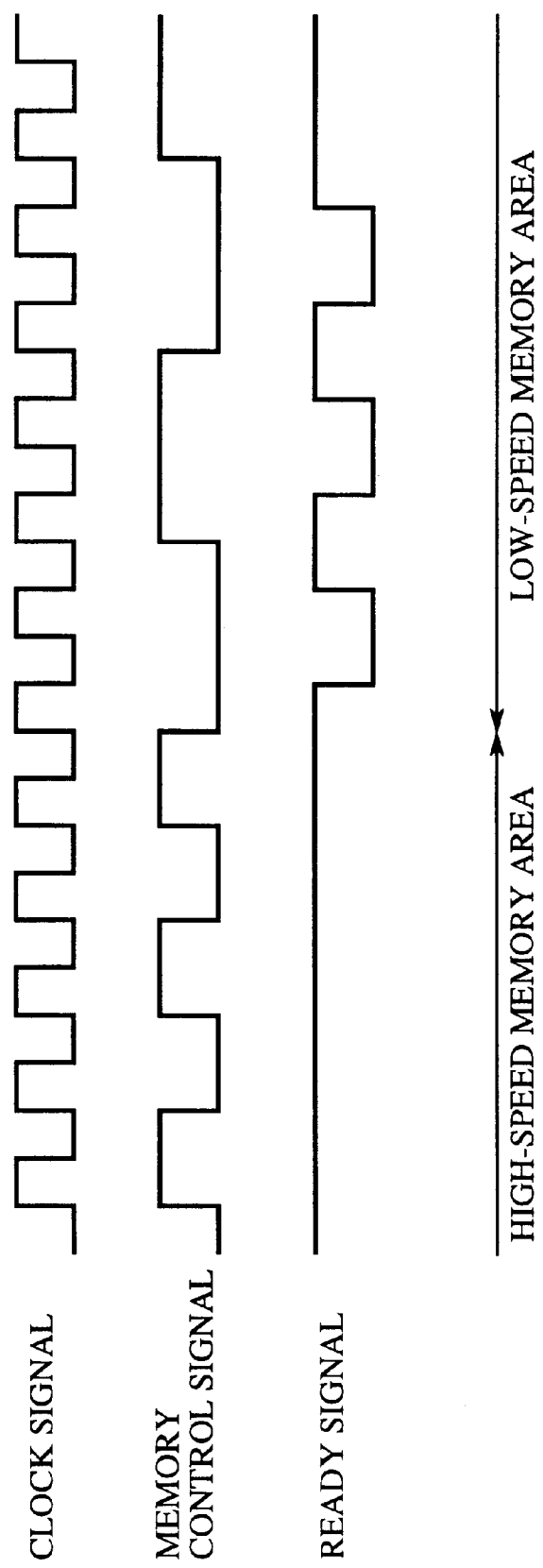

SEMICONDUCTOR DEVICE WITH CLOCK SIGNAL SELECTION CIRCUIT

BACKGROUND OF THE INVENTION

1. Field of the Invention

The present invention relates to a semiconductor device provided with peripheral devices such as an external memory and the like, and more particularly to a semiconductor device such as a one-chip microcomputer which is capable of varying the frequency of a clock signal to be input to a central processing unit (hereinafter referred to just as a "CPU") so as to permit an access to the peripheral devices which are disposed in the memory device and having different access speed from one another.

2. Description of the Related Art

FIG. 10 is a block diagram showing the general configuration of a conventional semiconductor device for use in a system employing a microcomputer therein, and FIG. 11 is a timing chart indicating the operation of the system shown in FIG. 10. In FIG. 10, reference numeral 41 denotes a microcomputer, numeral 42 denotes a CPU, 43 denotes a clock signal generator, 44 denotes a wait controller, 45 denotes a peripheral device, 46 denotes a peripheral device control signal, 47 denotes a clock signal and numeral 48 denotes a ready signal.

When operating this microcomputer-application system, if a clock signal 47 having a frequency adapted to the low access speed of the peripheral device 45 is input, the overall operational speed of the entire system is lowered. For this reason, in the case where the microcomputer 41 makes an access to the peripheral device 45, the CPU 42 is put in a waiting state as shown in FIG. 11, by setting the ready signal 48 which is to be input to the CPU 42 to an inactive state, so as to prolong the output period of the peripheral device control signal 46, thereby to provide a peripheral device control signal 46 that corresponds to the low-speed access of the peripheral device 45 on the basis of the high-frequency clock signal 47.

Since the conventional semiconductor device is configured as explained above, in accordance with a recent high-speed trend of the CPU, it has become difficult to cope with it only by use of a wait controller when accessing to a low-speed access peripheral device.

There is also another problem that the structure of a wait controller itself is so complicated that the system as a whole becomes expensive.

Further, since the operational clock frequency of the CPU is not changed but maintained at high level during the accessing operation to a low-speed access peripheral device, there has been a waste of power consumption.

Still further, since there is a difference in accessing speed among individual peripheral devices, it is difficult to provide a clock signal of a frequency adapted to each of the target peripheral devices.

SUMMARY OF THE INVENTION

The present invention has been proposed to solve the problems aforementioned, and it is an object of the present invention to provide a semiconductor device which is capable of varying the frequency of a clock signal to be input to the CPU, in accordance with the peripheral device to be accessed, but without using the wait controller.

Another object of the present invention is to provide a semiconductor device that provides a clock signal corresponding to the frequency of the peripheral device to be accessed.

The semiconductor device according to a first aspect of the present invention is constructed in such a manner that it comprises: a CPU, an address decoder that decodes an address signal transmitted from the CPU and outputs an address area specifying signal for specifying an address area in which a designated address is included, a frequency divider that divides a base clock signal and outputs one or more than one low-speed clock signals whose frequencies have been lowered, and a clock signal decision circuit that selects as to which one of the base clock signal and the frequency-divided clock signals is to be input to the CPU in accordance with the address area specifying signal output from the address decoder.

The semiconductor device according to another aspect of the present invention further comprises a clock specifying register composed of a plurality of clock specifying bits, into which data can be written by the CPU, and each corresponding to the respective one of a predetermined number of divided address areas, wherein each of the clock specifying bits instructs to the clock signal decision circuit as to which one of the base clock signal and the frequency-divided clock signals is to be input to the CPU.

The semiconductor device according to further aspect of the present invention further comprises a frequency specifying register composed of a plurality of frequency specifying bits, into which data can be written by the CPU, each corresponding to the respective one of a plurality of stages in a multi-stage frequency divider, wherein each of the frequency specifying bits instructs to the clock signal decision circuit as to which one of the clock signals is to be input to the CPU, the division rates of which clock signals being different from one another obtainable from each of the multi-stage frequency divider composed of a plurality of flip-flops.

The semiconductor device according to still further aspect of the present invention further comprises: a clock specifying register composed of a plurality of clock specifying bits, into which data can be written by the CPU, and each corresponding to the respective one of a predetermined number of divided address areas, wherein each of the clock specifying bits instructs to the clock signal decision circuit as to which one of the base clock signal and the frequency-divided clock signals is to be input to the CPU, and a frequency specifying register composed of a plurality of frequency specifying bits, into which data can be written by the CPU, each corresponding to the respective one of a plurality of stages in a multi-stage frequency divider, wherein each of the frequency specifying bits instructs to the clock signal decision circuit as to which one of the clock signals is to be input to the CPU, the division rates of which clock signals being different from one another obtainable from each of the multi-stage frequency divider composed of a plurality of flip-flops.

The semiconductor device as constructed above can be arranged such that it further comprises a disable register, into which data can be written by the CPU, and a logic circuit connected to the disable register, wherein when a predetermined value is written into the disable register, the function of the clock signal decision circuit is disabled, and a base clock signal can be always input to the CPU.

BRIEF DESCRIPTION OF THE DRAWINGS

FIG. 11 is a timing chart showing the operation of the system shown in FIG. 10.

DETAILED DESCRIPTION OF THE PREFERRED EMBODIMENTS

Several embodiments of the present invention are now explained below.

First Embodiment

Figure 1:
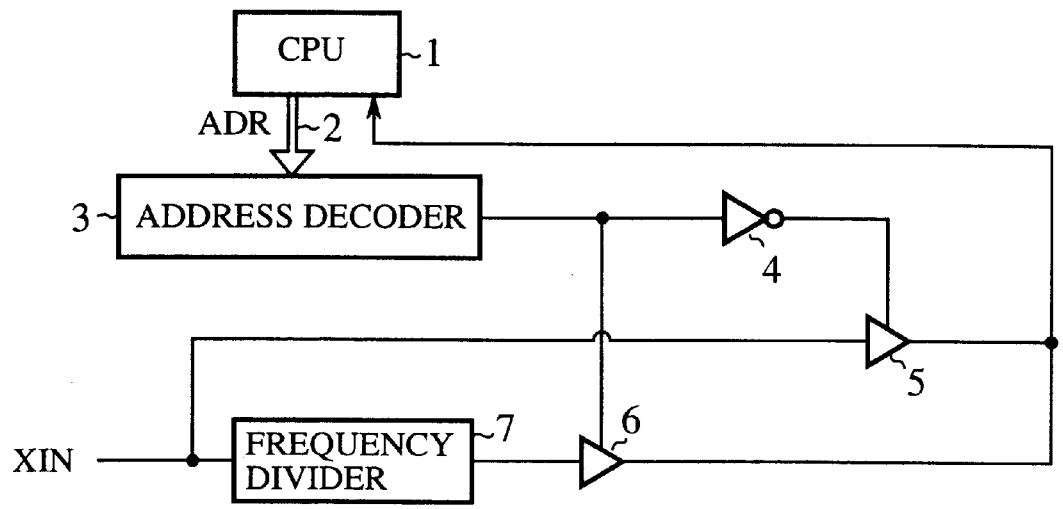
FIG. 1 is a schematic diagram showing the configuration of a semiconductor device according to a first embodiment of the present invention.

FIG. 1 is a schematic diagram showing the configuration of the semiconductor device according to a first embodiment of the present invention. In the figure, reference numeral 1 denotes a CPU, numeral 2 denotes an address bus, 3 denotes an address decoder, which decodes an address signal transmitted through the address bus 2 and outputs an address area specifying signal for specifying an address area in which the designated address is included. To the address area including the designated address in which a low-speed access peripheral device is set, the address decoder 3 outputs an H level signal as an address area specifying signal so as to input a low-frequency clock signal to the CPU 1, whereas to the address areas other than the above address area, the address decoder 3 outputs an L level signal as an address area specifying signal so as to input a normal clock signal to the CPU 1.

Further, reference numeral 4 denotes an inverter, numerals 5 and 6 denote 3-state gates, 7 denotes a frequency divider, reference symbol ADR denotes an address signal transmitted through the address bus 2, and XIN denotes a clock signal which is the base clock signal fed from a clock signal generator (not shown). The base clock signal XIN is fed to the CPU 1 by way of the 3-state gate 5, whereas the low-speed clock signal generated by lowering the frequency of the clock signal XIN is fed to the CPU 1 by way of the 3-state gate 6. A control terminal of the 3-state gate 6 is connected to the output line of the address decoder 3, whereas a control terminal of the 3-state gate 5 is connected to the output line of the address decoder 3 by way of the inverter 4. It should be noted that in the present embodiment, a clock signal decision circuit for deciding as to which of the base clock signal XIN and the frequency-divided clock signal should be input to the CPU 1 is composed of the inverter 4 and the 3-state gates 5 and 6.

Figure 2:
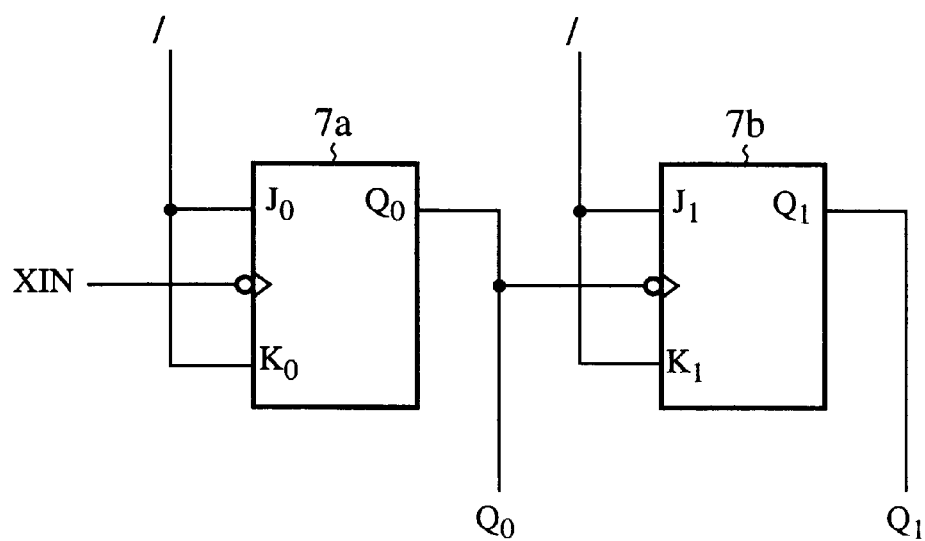
FIG. 2 is a block diagram showing an exemplary circuit configuration of the frequency divider.

FIG. 2 is a block diagram showing an exemplary circuit configuration of the frequency divider 7. In the figure, reference numerals 7a and 7b denote JK flip-flops, wherein an H level signal is input to both the positive inputs $J_0$ and $J_1$ and the negative inputs $K_0$ and $K_1$ of the respective flip-flops 7a and 7b. Further, the base clock signal XIN is input to the clock input of the flip-flop 7a, whereas a positive output $Q_0$ of the flip-flop 7a is input to the clock input of the flip-flop 7b. By this configuration, if the positive output $Q_0$ of the flip-flop 7a is taken out as an output of the frequency divider 7, a clock signal which is a ½ frequency of that of the clock signal XIN can be obtained, whereas a clock signal which is a ¼ frequency of that of the clock signal XIN can be obtained if the positive output $Q_1$ of the flip-flop 7b is taken out as an output of the frequency divider 7.

The operation of the semiconductor device according to the first embodiment is now explained as below.

When an address signal ADR designating an address in which a target peripheral device such as an external memory is set is transmitted to the address decoder 3 from the CPU 1, the address decoder 3 decodes the address signal ADR. Here, if the designated address is of a low-speed access peripheral device, the address decoder outputs an H level signal, and in this case, as the inverter 4 outputs an L level signal, the 3-state gate 5 is set to a non-conductive state, whereas the other 3-state gate 6 is set to a conductive state, so that a low-speed clock signal whose frequency has been lowered is fed to the CPU 1 from the frequency divider 7.

On the other hand, if the designated address in which a high-speed access peripheral device such as an internal memory is set is fed to the address decoder 3 from the CPU 1, the address decoder 3 decodes the address signal ADR, and outputs an L level signal, and in this case, as the 3-state gate 5 is set to a conductive state, and the other 3-state gate 6 is set to a non-conductive state, a base cock signal XIN is fed to the CPU 1 without the frequency dividing operation.

As explained above, according to the first embodiment of the present invention, in the case where a low-speed access peripheral device is to be operated, a signal specifying the address area in which a target peripheral device is set is output, and a low-speed clock signal is fed to the CPU 1, so that even a low-speed access peripheral device can be readily accessed.

Further, according to the first embodiment of the present invention, a semiconductor capable of varying the frequency of a clock signal to be input to the CPU can be obtained with a relatively simple configuration, without the use of a complicated device such as a wait controller.

Still further, during the accessing operation to a low-speed access peripheral device is being carried out, the operational frequency of the CPU can be lowered, so that overall power consumption can be greatly reduced.

Second Embodiment

Figure 3:
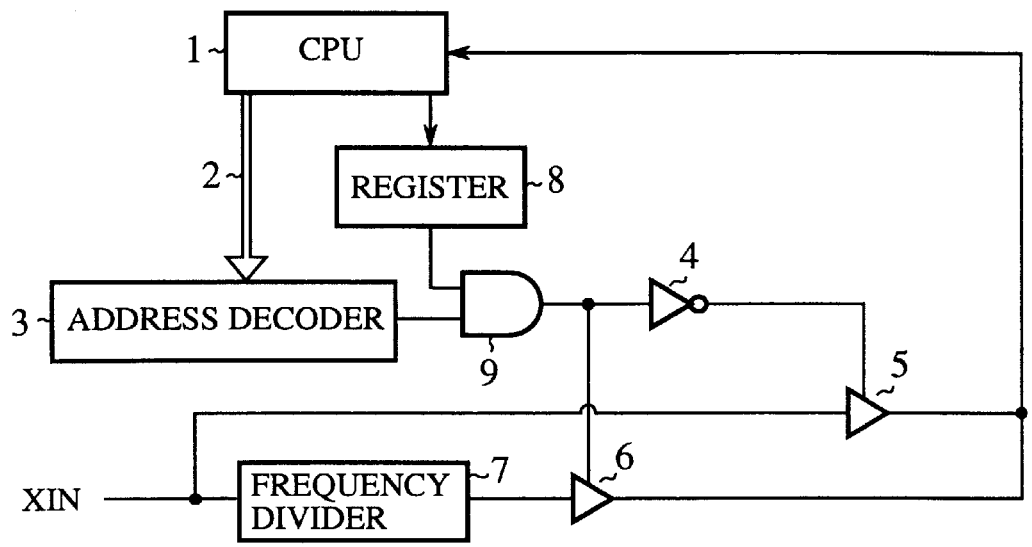
FIG. 3 is a schematic diagram showing the configuration of a semiconductor device according to a second embodiment of the present invention.

FIG. 3 is a schematic diagram showing the configuration of the semiconductor device according to a second embodiment of the present invention. Since the same reference numbers as those shown in FIG. 1 represent the same or similar portions, the explanation thereabout is omitted here.

In FIG. 3, reference numeral 8 denotes a register (disable register) into which a one-bit data can be written, and numeral 9 denotes a 2-input AND gate (logic gate). The disable register 8 and the AND gate 9 compose a disable circuit that disables function of the clock signal decision circuit as explained in the case of the first embodiment, and always enables the clock signal XIN to be input to the CPU 1.

The operation of the semiconductor device according to the second embodiment is now explained as below.

The CPU 1 writes "0" or "1" into the register 8 in accordance with the condition or the like under which the microcomputer is used. When "1" is written into the register 8, an output of the address decoder 3 becomes the output of the AND gate 9, and thus the operation of the circuit is same as that of the semiconductor device of the first embodiment. On the other hand, when "0" is written into the register 8, the output of the AND gate 9 becomes always in the L level, and thus the clock signal XIN is input to the CPU 1.

As explained above, according to the second embodiment of the present invention, not only the same effect as that of the first embodiment can be obtained, but it can also be arranged such that the clock signal XIN can be input to the CPU 1 the whole time by disabling the function of the clock signal decision circuit through a software method, so that the clock signal frequency can be variably set in accordance with the condition or the like under which the microcomputer is used.

Third Embodiment

Figure 4:
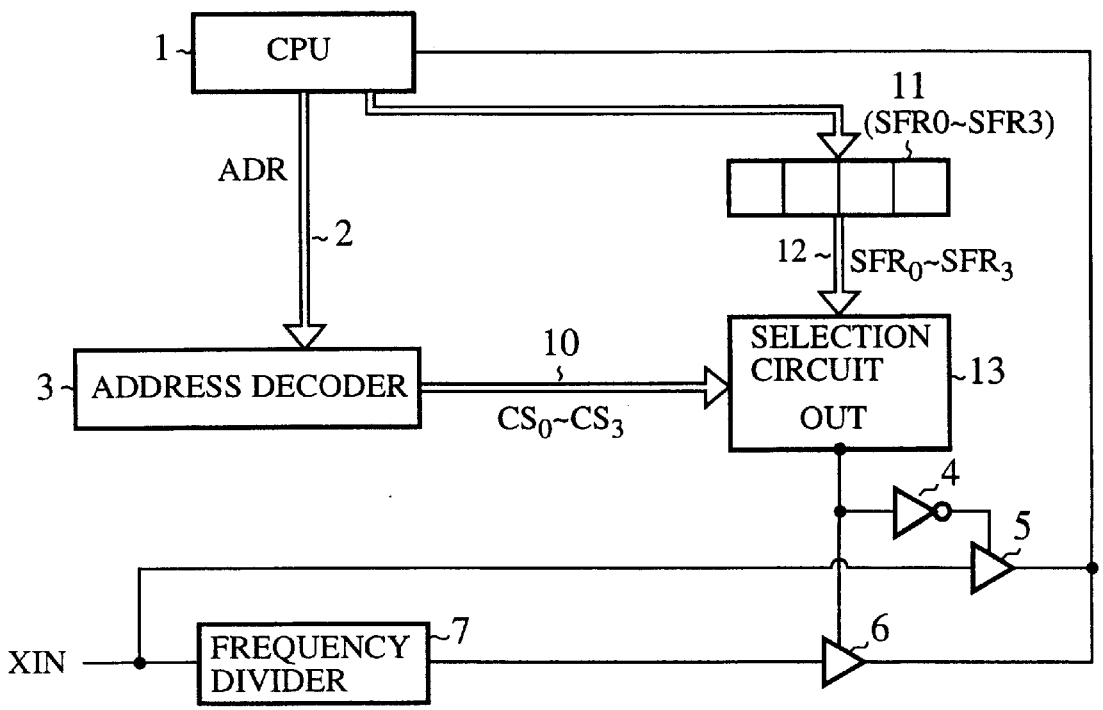
FIG. 4 is a schematic diagram showing the configuration of a semiconductor device according to a third embodiment of the present invention.

FIG. 4 is a schematic diagram showing the configuration of the semiconductor device according to a third embodiment of the present invention. Since the same reference numbers as those shown in FIG. 1 represent the same or similar portions, the explanation thereabout is omitted here.

In FIG. 4, reference numeral 10 denotes an address area specifying signal bus for transmitting address area specifying signals $CS_0$ to $CS_3$ output from the address decoder 3, numeral 11 denotes a 4-bit clock specifying register to specify for each one of the divided address areas as to which one of the base clock signal XIN and the frequency divided clock signal is to be input to the CPU 1, numeral 12 denotes a clock specifying signal bus for transmitting clock specifying signals $SFR_0$ to $SFR_3$ output from the clock specifying register 11, and numeral 13 denotes a selection circuit for outputting a signal that selects the frequency of the clock signal to be input to the CPU 1 on the basis of the clock specifying signal fed from the shift register 11 and the address area specifying signal fed from the address decoder 3.

In this embodiment, it is shown a case in which the address area is divided into 4 areas, and the address area specifying signal bus 10 is extended from the address decoder 3 for transmitting the address area specifying signals $CS_0$ to $CS_3$ corresponding to each of the thus divided 4 address areas, wherein an H level signal is output to only one of the signal lines of the bus 10 corresponding to the address area CSi specified by the address decoder 3. Further, in order to correspond to each of the 4-divided address areas, the clock specifying bits SFR0 to SFR3 that determines as to which one of the base clock signal and the frequency divided clock signals is one to be input to the CPU 1 are set in the shift register 11, and in the case where a clock signal of low frequency has to be input to the CPU 1 for the respective address areas, "1" is written into the clock specifying bit corresponding to the specified address area.

The selection circuit 13 is configured in such a manner that only when "1" is written in the clock specifying bit within the shift register 11 that corresponds to the address area specified by the address decoder 3 including an address in which a target peripheral device is set, a low-speed clock signal whose frequency has been lowered by the frequency divider 7 is input to the CPU 1.

Figure 5:
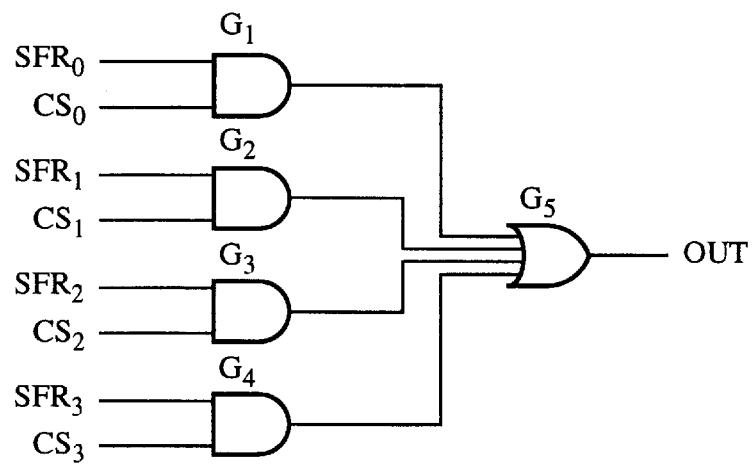
FIG. 5 is a block diagram showing an exemplary circuit configuration the selection circuit.

FIG. 5 is a block diagram showing an exemplary circuit configuration of the selection circuit 13. As shown in FIG. 5, the selection circuit 13 is composed of a plurality of 2-input AND gates, namely $G_1, G_2, G_3, G_4$ and a 4-input OR gate $G_5$, and in this configuration, an address area specifying signal CSi and a clock specifying signal SFRi are input to each of these ADN gates, and the outputs from these 2-input gates are fed to the OR gate $G_5$. The output of the OR gate $G_5$ becomes the output of the selection circuit 13. Further in this embodiment, the clock signal decision circuit for determining as to which one of the clock signals is to be input is composed of the selection circuit 13, the inverter 4 and the 3-state gates 5 and 6.

The operation of the semiconductor device according to the third embodiment is now explained as below.

If, for example, a low-speed clock signal has to be input to the second address area within the 4-divided address areas on the basis of the access speed and the like of the target peripheral device, "1" is written into the clock specifying bit SFR1 from the CPU 1. On the other hand, if it is not necessary to input a low-speed clock signal to the third address area, "0" is written into the clock specifying bit SFR2 from the CPU 1.

When an address signal ADR of the target peripheral device is input from the CPU 1, and the corresponding address is included in the second address area, an address specifying signal $CS_1$ only is set to the H level by the address decoder 3. Here, since "1" has been written in the clock specifying bit SFR1 that corresponds to the second address area, the outputs from the AND gate $G_2$ and the OR gate $G_5$ are set to the H level. When the signal of "H" level is output from the selection circuit 13, the 3-state gate 5 is put into a non-conductive state, while the other 3-state gate 6 is put into a conductive state, so that a low-speed clock signal whose frequency has been lowered by the frequency divider 7 is fed to the CPU 1.

On the other hand, when an address signal ADR of the target peripheral device is input from the CPU 1, and the corresponding address is included in the third address area, then an address specifying signal $CS_2$ only is set to the H level by the address decoder 3. Here, since "0" has been written in the clock specifying bit SFR2 that corresponds to the third address area, the outputs from the AND gate $G_3$ and the OR gate $G_5$ are set to the L level. When the signal of "L" level is output from the selection circuit 13, the 3-state gate 5 is put into a conductive state, while the other 3-state gate 6 is put into a non-conductive state, so that the clock signal XIN is fed to the CPU 1. It should be noted that although it has been explained as to the operations concerning the second address and the third address just for convenience, the similar operations are carried out also as to the case of the first address and the fourth address.

As explained above, according to the third embodiment, the same effect as that of the first embodiment can be obtained, but since it is provided with a clock specifying register 11 composed of a plurality of clock specifying bits SFR0 to SFR3, and in which data can be written by the CPU 1, frequency of the clock signal to be input to the CPU 1 can be optimized for each of the divided address areas through a software method in accordance with the access speed of the peripheral device that is set in the designated address.

It should be noted that in the third embodiment as explained above, the address area is divided into 4 areas, but the number of division is not limited to this, and in fact, other division number can be adopted in accordance with the function, application and other various factors of the system in which the microcomputer is adopted.

Fourth Embodiment

Figure 6:
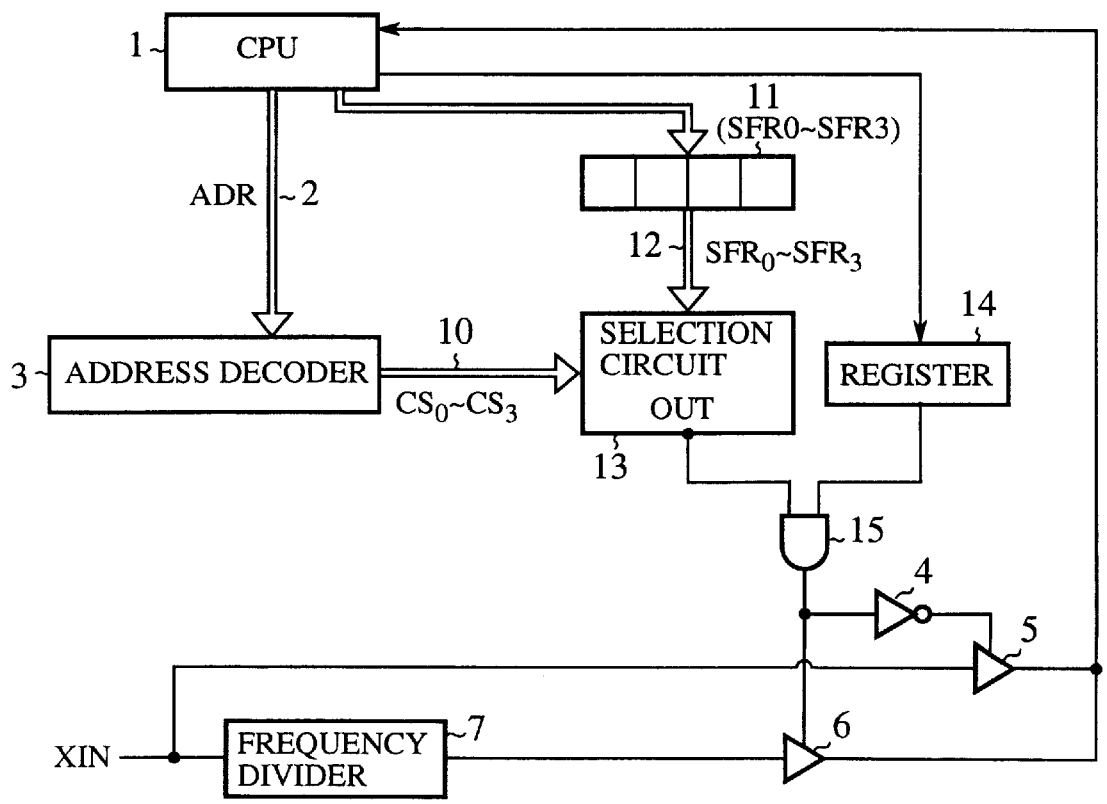
FIG. 6 is a schematic diagram showing the configuration of a semiconductor device according to a fourth embodiment of the present invention.

FIG. 6 is a schematic diagram showing the configuration of the semiconductor device according to a fourth embodiment of the present invention. Since the same reference numbers as those shown in FIG. 4 represent the same or similar portions, the explanation thereabout is omitted here.

In FIG. 6, reference numeral 14 denotes a register (disable register) into which one-bit data can be written, and numeral 15 denotes a 2-input AND gate (logic gate). Further, the disable register 14 and the AND gate 15 compose a disable circuit that disables the function of the clock signal decision circuit as explained in the case of the third embodiment, and enables the CPU 1 to receive the clock signal XIN the whole time.

The operation of the semiconductor device according to the fourth embodiment is now explained as below.

The CPU 1 writes either "0" or "1" into the register 14. When "1" is written into the register 14, an output of the selection circuit 13 becomes the output of the AND gate 15, so that the operation of this circuit is same as that of the semiconductor device of the third embodiment. On the other hand, when "0" is written into the register 14, an output of the selection circuit always becomes L level, so that the clock signal XIN is input to the CPU 1.

As explained above, according to the fourth embodiment, not only the same effect as that of the third embodiment can be obtained, but it can be arranged such that the clock signal XIN can be input to the CPU 1 the whole time by disabling the function of the clock signal decision circuit through a software method, regardless of the value of the clock specifying bit of the shift register 11, so that the frequency of the clock signal can be variably set in accordance with the condition or the like under which the microcomputer is used.

Fifth Embodiment

Figure 7:
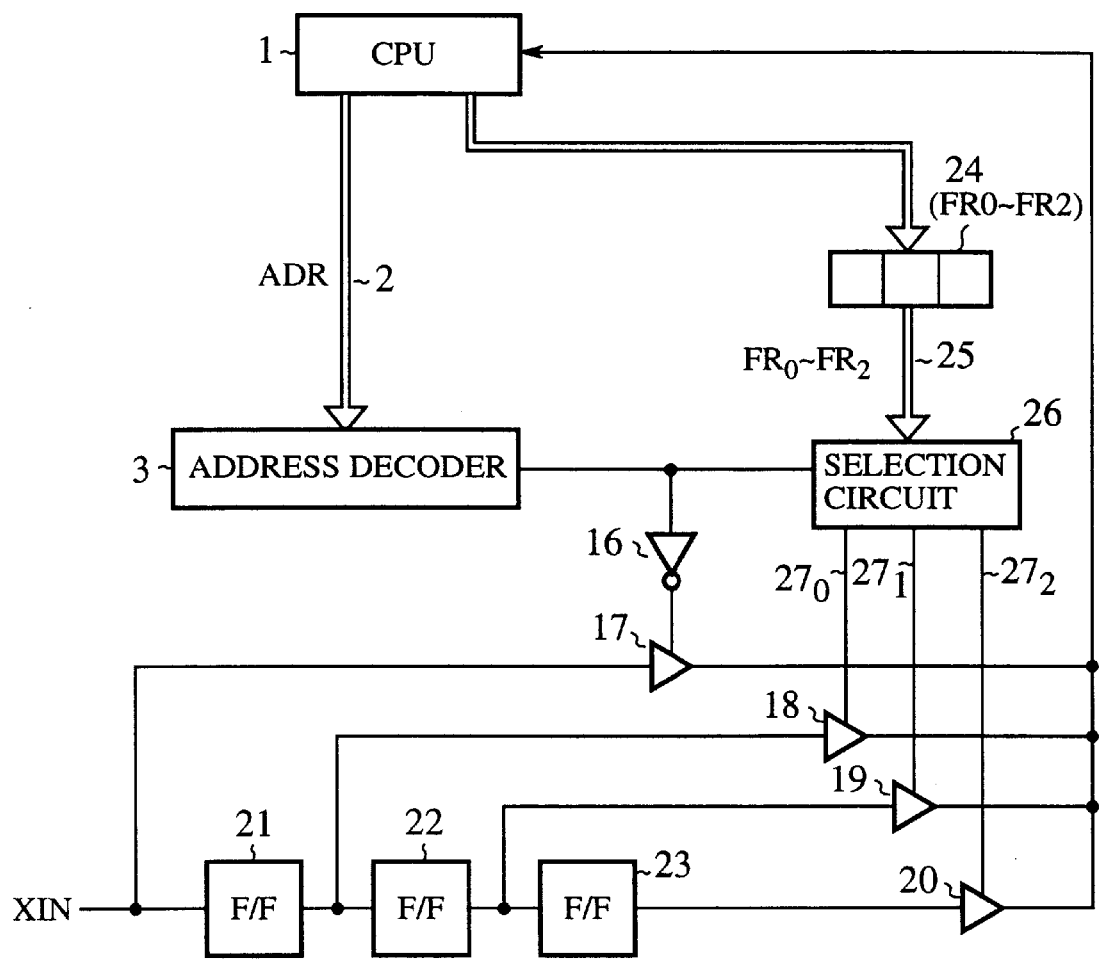
FIG. 7 is a schematic diagram showing the configuration of a semiconductor device according to a fifth embodiment of the present invention.

FIG. 7 is a schematic diagram showing a configuration of the semiconductor device according to a fifth embodiment of the present invention. Since the same reference numbers as those shown in FIG. 1 represent the same or similar portions, the explanation thereabout is omitted here.

In FIG. 7, reference numeral 16 denotes an inverter, numerals 17, 18, 19 and 20 denote 3-stae gates, numerals 21, 22 and 23 denote flip-flops for dividing the frequency of the clock signal XIN, which are JK flip-flops having the same configuration and connection state as those shown in FIG. 2. Reference numeral 24 denotes a 3-bit frequency specifying register for determining as to which of the clock signals is to be input to the CPU 1, wherein these signals can be obtained from each stage of the multi-stage frequency divider composed of the plurality of flip-flops 21, 22 and 23, and the division rates thereof are different from one another. Further, numeral 25 denotes a frequency specifying signal bus for transmitting the frequency specifying signals $FR_0$ to $FR_2$ which are output from the frequency specifying register 24, numeral 26 denotes a selection circuit for outputting the signals in parallel, each of which determines the frequency of the clock signal to be input to the CPU 1 on the basis of the address area specifying signal fed from the address decoder 3 and the frequency specifying signal fed from the frequency specifying register 24, and reference numerals $27_0$, to $27_2$ are control signal lines for transmitting control signals output from the selection circuit 26 in order to control the conductive and non-conductive states of the 3-state gates 18, 19 and 20.

In this embodiment, it is arranged such that frequency specifying bits FR0 to FR2 are set in the frequency specifying register 24 so as to correspond to each of the three frequency-divided clock signals, with a view to permitting a desired clock signal to be input to the CPU 1 among these three clock signals whose frequency-division rates are different from one another, and "1" is written by the CPU 1 into the frequency specifying bit corresponding to the desired clock signal.

The selection circuit 26 operates in such a manner as to input either one of the frequency-divided clock signals only when an address area specifying signal of the H level is input from the address decoder 3. In other words, when "1" is written in the frequency specifying bit FR0, a signal of H level is output to the control signal line $27_0$, when "1" is written in the frequency specifying bit FR1, a signal of H level is output to the control signal line $27_1$, and when "1" is written in the frequency specifying bit FR2, a signal of H level is output to the control signal line $27_2$.

Further, in this embodiment, a clock signal decision circuit for determining as to which one of a plurality of clock signals whose frequencies are different from one another is to be input is composed of the inverter 16, the 3-state gates 17, 18, 19 and 20, and also of the control signal lines $27_0$ to $27_2$.

The operation of the semiconductor device according to the fifth embodiment is now explained as below.

When an address signal ADR designating an address in which a target peripheral device such as an external memory or the like is set is transmitted to the address decoder 3 from the CPU 1, the address decoder 3 decodes the address signal. Here, if the designated address is an address in which a low-speed access peripheral device is set, the address decoder outputs an H level signal. In this state, if the value "1" is written in the frequency specifying bit FR0 of the frequency specifying register 24, a signal of H level is output to the control signal line $27_0$ from the selection circuit 26, and subsequently the 3-state gate 18 is brought into a conductive state and a clock signal whose frequency is ½ of the clock signal XIN is input to the CPU 1. If the value "1" is written in the frequency specifying bit FR1 of the frequency specifying register 24, a signal of H level is output to the control signal line $27_1$ from the selection circuit 26, and subsequently the 3-state gate 19 is brought into a conductive state and a clock signal whose frequency is ¼ of the clock signal XIN is input to the CPU 1. Further, if the value "1" is written in the frequency specifying bit FR2 of the frequency specifying register 24, a signal of H level is output to the control signal line $27_2$ from the selection circuit 26, and subsequently the 3-state gate 20 is brought into a conductive state and a clock signal hose frequency is ⅛ of the clock signal XIN is input to the CPU 1.

On the other hand, if the designated address is an address in which a target peripheral device such as an inner memory or a high-speed access peripheral device is set, the address decoder 3 outputs an L level signal. In this case, the selection circuit 26 does not operate, and a signal of H level is input to the control terminal of the 3-state gate 17 by way of the inverter 16, so that the 3-state gate 17 is brought into a conductive state, and subsequently, the clock signal XIN whose frequency has not been divided is input to the CPU 1.

As explained above, according to the fifth embodiment, the same effect as that of the first embodiment can be obtained, but since it is provided with a frequency specifying register 24 which is composed of a plurality of frequency specifying bits FR0 to FR2, and in which a signal from the CPU 1 can be written, as to the frequency of the clock signal to be input to the CPU 1, an optimum frequency can be set by a software method, in accordance with the access speed of the target peripheral device.

It should be noted that in the fifth embodiment as explained above, three clock signals whose division rates are different from one another can be selected, but the number of these frequency-divided clock signals is not limited to this, and in fact, other number of frequency-divided clocks can be adopted in accordance with the function, application of the system and the like in which the microcomputer is used.

Sixth Embodiment

Figure 8:
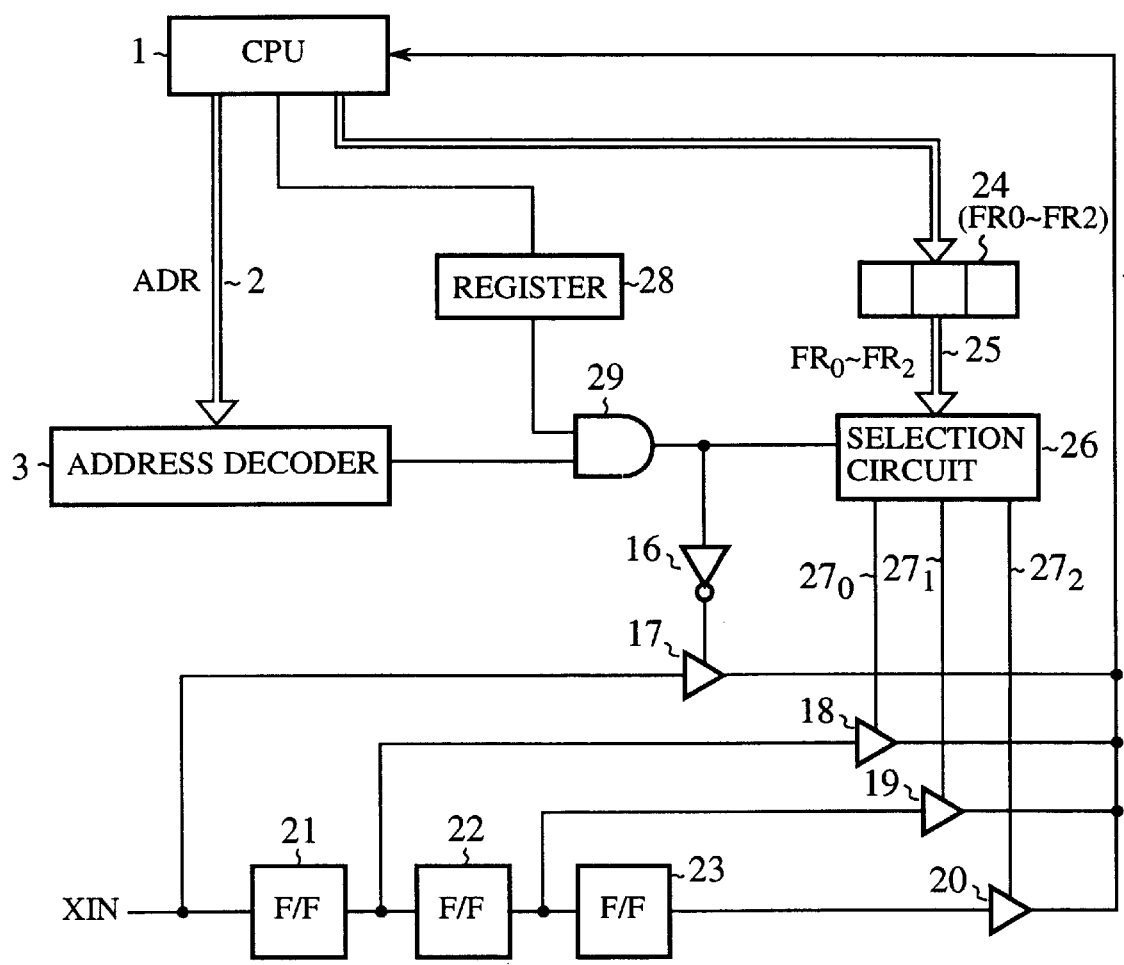
FIG. 8 is a schematic diagram showing the configuration of a semiconductor device according to a sixth embodiment of the present invention.

FIG. 8 is a schematic diagram showing the configuration of the semiconductor device according to a sixth embodiment of the present invention. Since the same reference numbers as those shown in FIG. 7 represent the same or similar portions, the explanation thereabout is omitted here.

In FIG. 8, reference numeral 28 denotes a register (disable register) in which a one-bit data can be written, and 29 denotes a 2-input AND gate (logic gate). The disable register 28 and the AND gate 29 compose a disable circuit that disables function of the selection circuit, and always enables the CPU 1 to receive the base clock signal XIN.

The operation of the semiconductor device according to the sixth embodiment is now explained as below.

The CPU 1 writes either "0" or "1" into the register 28 in accordance with the condition or the like under which the microcomputer is used. When "1" is written into the register 28, an output of the address decoder 3 becomes the output of the AND gate 29, so that the operation of this circuit is same as that of the semiconductor device of the fifth embodiment. On the other hand, when "0" is written into the register 28, the output of the AND gate 29 always becomes L level, so that the clock signal XIN is input to the CPU 1.

As explained above, according to the sixth embodiment, not only the same effect as that of the fifth embodiment can be obtained, but since it is arranged such that the clock signal XIN can be input to the CPU 1 the whole time by disabling the function of the selection circuit through a software method, regardless of the value of the frequency specifying bit of the shift register 24, the frequency of the clock signal can be set flexibly in accordance with the condition or the like under which the microcomputer is used.

Seventh Embodiment

Figure 9:
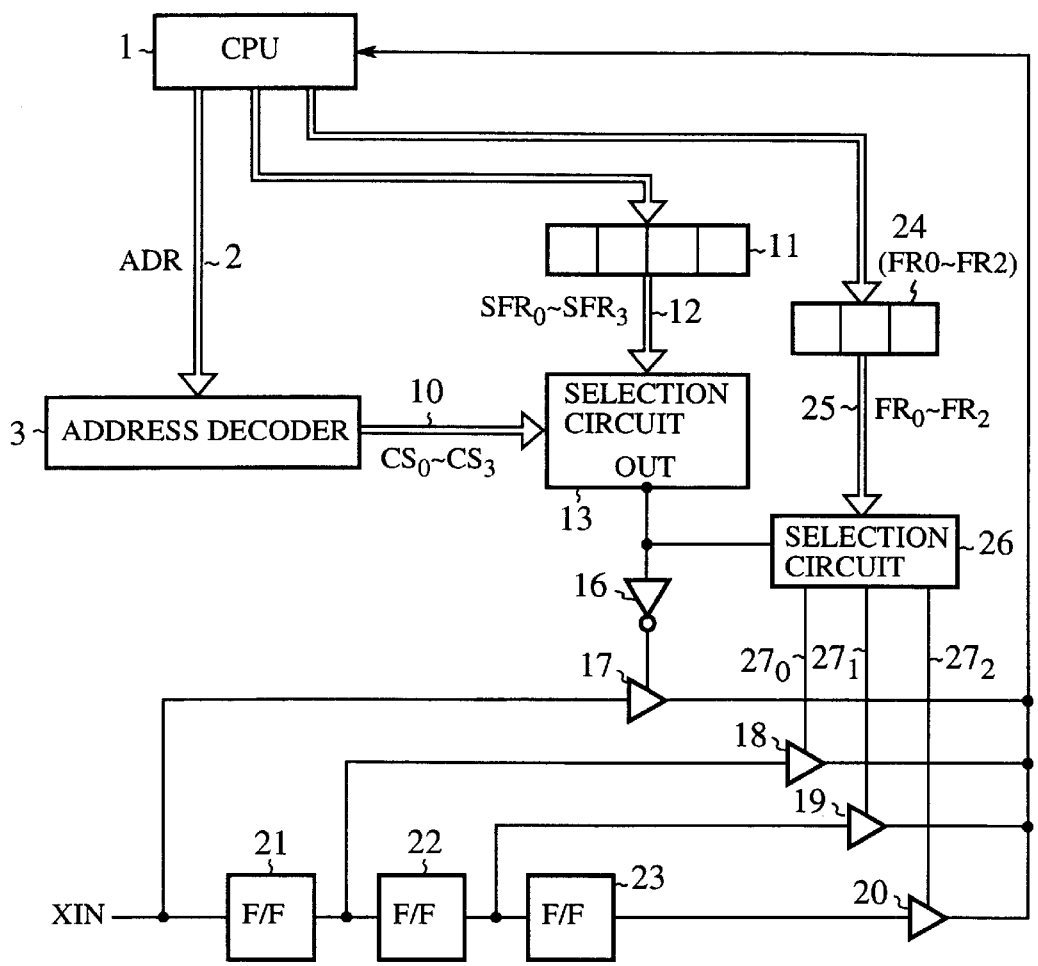
FIG. 9 is a schematic diagram showing the configuration of a semiconductor device according to a seventh embodiment of the present invention.
Figure 10:
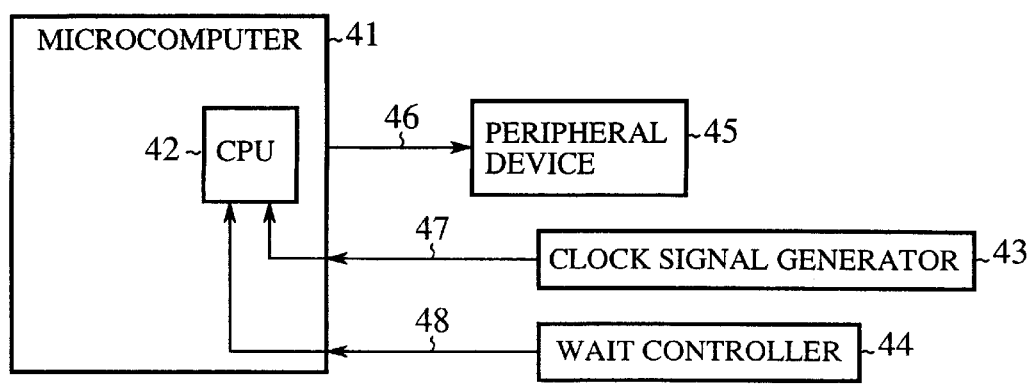
FIG. 10 is a schematic diagram showing a conventional semiconductor device for use in a conventional microcomputer-application system.

FIG. 9 is a schematic diagram showing the configuration of the semiconductor device according to a seventh embodiment of the present invention. Since the same reference numbers as those shown in FIG. 4 and FIG. 7 represent the same or similar portions, the explanation thereabout is omitted here.

In this embodiment, the clock signal decision circuit for determining as to which one of the plurality of clock signals whose frequencies are different from one another is to be input is composed of the selection circuit 13, the other selection circuit 26, the inverter 16, the 3-satte gates 17, 18, 19 and 20, and also of the control signal lines $27_0$ to $27_2$.

The operation of the semiconductor device according to the seventh embodiment is now explained as below.

In the case where the address area is divided for example into 4 areas, if the base clock signal XIN is to be input to the CPU, in accordance with the access speed of the target peripheral device set in an address within each of the divided address areas, "0" is written as to each of the clock specifying bit SFRi of the register 11, whereas "1" is written if a frequency-divided low-speed clock signal is to be input. Further, "1" is written in one of the frequency specifying bits FR0 to FR2 of the register 24 in accordance with the access speed of the peripheral device connected to the designated address area.

When an address signal ADR as to the target peripheral device is input from the CPU 1, the address signal ADR is decoded by the address decoder 3, and an address area specifying signal that specifies the address area $CS_i$ including the address in which the target peripheral device is set is transmitted to the selection circuit 13. In this state, if "0" is written in the clock specifying bit SFRi that corresponds to the address area $CS_1$, the selection circuit 13 outputs an L level signal, and if "1" is written in the clock specifying bit SFRi, the selection circuit 13 outputs an H level signal.

When an L level signal is output from the selection circuit 13, an H level signal is fed to the control terminal of the 3-state gate 17 by way of the inverter 16, so as to bring the 3-state gate 17 into a conductive state, and thus the base clock XIN is input to the CPU 1.

On the other hand, when an H level signal is output from the selection circuit 13, the selection circuit 26 is brought into a conductive state.

In this state, if "1" is written in the frequency specifying bit FR0, the 3-state gate 18 is brought into a conductive state, thereby to input a clock signal having a ½ of the frequency of the clock signal XIN to the CPU 1, whereas if "1" is written in the frequency specifying bit FR1, the 3-state gate 19 is brought into a conductive state, thereby to input a clock signal having a ¼ of the frequency of the clock signal XIN to the CPU 1, and further if "1" is written in the frequency specifying bit FR2, the 3-state gate is brought into a conductive state, thereby to input a clock signal having a ⅛ of the frequency of the clock signal XIN to the CPU 1.

As explained above, according to the seventh embodiment, although the same effect as that of the first embodiment can be obtained, since it is arranged such that it can be determined as to whether or not the clock signal XIN is to be frequency-divided by use of the address specifying register 11 for each of the suitably divided address areas, and that a desired clock frequency among the plurality of divided frequencies can be selected by use of the frequency specifying register 24, so as to input the corresponding frequency of the clock signal to the CPU 1, not only whether to divide the frequency of the base clock signal in accordance with the access speed of the target peripheral device can be determined, but in case of frequency dividing, an optimum frequency among a plurality of divided frequencies can be set through a software method.

It should be noted that although the seventh embodiment as explained above, the address area is divided into 4 areas, and one of three clock signals whose frequencies are different from one another can be selected, but the number of division of the address areas and the number of selectable frequency-divided clock signals are not limited to the above numbers, and in fact, other division number can be adopted in accordance with the function, application of the system and the like in which the microcomputer is used.

The embodiments from the first to the seventh have been explained as to the case in which when an address decoded by the address decoder is included in an external address area in which a low-speed access peripheral device is set, a low-speed clock signal generated by dividing the frequency of the normal clock signal XIN is input to the CPU.

However, even as to the case in which an address decoded by the address decoder is included in an inner address area in which a high-speed access peripheral device such as an inner memory or the like is set, it is possible to input a low-speed clock signal to the CPU so as to reduce the overall operational speed with the same configuration and operation principles. Due to this, the operation is made possible even in a low-voltage area in which the operation of only a specified operation block is slowed down.

As explained heretofore, according to the present invention, the semiconductor device is arranged such that it comprises; an address decoder that decodes an address signal transmitted from the CPU and outputs an address specifying signal for specifying an address area in which a designated address is included, and a clock signal decision circuit that determines as to which one of the base clock signal and the frequency-divided clock signals is to be input to the CPU in accordance with the address area specifying signal, so that in a case where a target peripheral device whose access speed is relatively slow is to be accessed, a signal that specifies an address area in which the address of the target peripheral device is included is output, and subsequently a low-speed clock signal is input to the peripheral device, and thus it can readily access even to a low-speed access peripheral device.

The semiconductor device according to the present invention is capable of varying the frequency of the clock signal to be input to the CPU with a very simple construction, and even without using a complex device such as a wait controller.

Further, since the semiconductor device according to the present invention can reduce the operational frequency of the CPU during the time in which a low-speed access peripheral device is being accessed, power consumption can be greatly reduced.

According to the present invention, the semiconductor device is arranged such that it comprises a clock specifying register, which is composed of a plurality of clock specifying bits, into which data can be written by the CPU, each corresponding to the respective address areas divided into a predetermined number, wherein each of he clock specifying bits instructs to the clock signal decision circuit as to which one of the base clock signal and the frequency-divided clock signals is to be input to the CPU, so that the frequency of the clock signal to be input to the CPU can be optimized through a software method in accordance with the access speed of the peripheral device that is set in the designated address for each of the divided address areas.

Further, according to the present invention, the semiconductor device is arranged such that it comprises a frequency specifying register, which is composed of a plurality of frequency specifying bits, into which data can be written by the CPU, and each of which instructs to the selection circuit as to which of the clock signals whose division rates are different from one another obtainable from each stage of the multi-stage frequency divider composed of a plurality of flip-flops is to be input to the CPU, for each of the stages, so that an optimum frequency of the clock signal to be input to the CPU can be set through a software method in accordance with the access speed of the target peripheral device.

Still further, according to the present invention, since it is arranged such that it comprises a clock specifying register and a frequency specifying register, whether to divide the frequency of the base clock signal can be determined through a software method in accordance with the access speed of the target peripheral device set in the designated address for each of the divided address areas, and in case of frequency diving, an optimum frequency can be set among a plurality of divided frequencies also through a software method.

Still further, according to the present invention, the semiconductor is arranged such that it comprises a disable register into which data can be written by the CPU and a logic circuit connected to the disabling register, wherein when a predetermined value is written into the disable register, the function of the clock signal decision circuit is disabled, and the base clock signal can thereby be always input to the CPU, so that the frequency of the clock signals can be set flexibly in accordance with the condition or the like under which the microcomputer is used.

What is claimed is:

1. A semiconductor device comprising:

a CPU, an address decoder that decodes an address signal transmitted from the CPU and outputs an address area specifying signal for specifying an address area in which a designated address is included, a frequency divider that divides a base clock signal and outputs one or more than one low-speed clock signals whose frequencies have been lowered, and a clock signal decision circuit that selects as to which one of the base clock signal and the frequency-divided clock signals is to be input to the CPU to adjust the CPU speed to match a memory speed in accordance with the address area specifying signal output from said address decoder.

2. A semiconductor device comprising:

a CPU, an address decoder that decodes an address signal transmitted from the CPU and outputs an address area specifying signal for specifying an address area in which a designated address is included, a frequency divider that divides a base clock signal and outputs one or more than one low-speed clock signals whose frequencies have been lowered, a clock signal decision circuit that selects as to which one of the base clock signal and the frequency-divided clock signals is to be input to the CPU in accordance with the address area specifying signal output from said address decoder, a disable register, into which data can be written by the CPU, and a logic circuit connected to said disable register, wherein when a predetermined value is written into said disable register, the function of said clock signal decision circuit is disabled, and a base clock signal can be always input to the CPU.

3. A semiconductor device comprising:

a CPU, an address decoder that decodes an address signal transmitted from the CPU and outputs an address area specifying signal for specifying an address area in which a designated address is included, a frequency divider that divides a base clock signal and outputs one or more than one low-speed clock signals whose frequencies have been lowered, a clock signal decision circuit that selects as to which one of the base clock signal and the frequency-divided clock signals is to be input to the CPU in accordance with the address area specifying signal output from said address decoder, and a clock specifying register composed of a plurality of clock specifying bits, into which data can be written by the CPU, and each corresponding to the respective one of a predetermined number of divided address areas, wherein each of said clock specifying bits instructs to said clock signal decision circuit as to which one of the base clock signal and the frequency-divided clock signals is to be input to the CPU.

4. A semiconductor device according to claim 3 further comprising a disable register, into which data can be written by the CPU, and a logic circuit connected to said disable register, wherein when a predetermined value is written into said disable register, the function of said clock signal decision circuit is disabled, and a base clock signal can be always input to the CPU.

5. A semiconductor device comprising:

a CPU, an address decoder that decodes an address signal transmitted from the CPU and outputs an address area specifying signal for specifying an address area in which a designated address is included, a frequency divider that divides a base clock signal and outputs one or more than one low-speed clock signals whose frequencies have been lowered, a clock signal decision circuit that selects as to which one of the base clock signal and the frequency-divided clock signals is to be input to the CPU in accordance with the address area specifying signal output from said address decoder, and a frequency specifying register composed of a plurality of frequency specifying bits, into which data can be written by the CPU, each corresponding to the respective one of a plurality of stages in a multi-stage frequency divider, wherein each of said frequency specifying bits instructs to said clock signal decision circuit as to which one of the clock signals is to be input to the CPU, the division rates of said clock signals being different from one another obtainable from each of said multi-stage frequency divider composed of a plurality of flip-flops.

6. A semiconductor device according to claim 5 further comprising a disable register, into which data can be written by the CPU, and a logic circuit connected to said disable register, wherein when a predetermined value is written into said disable register, the function of said clock signal decision circuit is disabled, and a base clock signal can be always input to the CPU.

7. A semiconductor device comprising:

a CPU, an address decoder that decodes an address signal transmitted from the CPU and outputs an address area specifying signal for specifying an address area in which a designated address is included, a frequency divider that divides a base clock signal and outputs one or more than one low-speed clock signals whose frequencies have been lowered, a clock signal decision circuit that selects as to which one of the base clock signal and the frequency-divided clock signals is to be input to the CPU in accordance with the address area specifying signal output from said address decoder, a clock specifying register composed of a plurality of clock specifying bits, into which data can be written by the CPU, and each corresponding to the respective one of a predetermined number of divided address areas, wherein each of said clock specifying bits instructs to said clock signal decision circuit as to which one of the base clock signal and the frequency-divided clock signal is to be input to the CPU, and a frequency specifying register composed of a plurality of frequency specifying bits, into which data can be written by the CPU, each corresponding to the respective one of a plurality of stages in a multi-stage frequency divider, wherein each of said frequency specifying bits instructs to said clock signal decision circuit as to one which of the clock signals is to be input to the CPU, the division rates of said clock signals being different from one another obtainable from each of said multi-stage frequency divider composed of a plurality of flip-flops.

* * * * *